United States Patent
Wei

(10) Patent No.: US 10,821,771 B2
(45) Date of Patent: Nov. 3, 2020

(54) HEAT TRANSFER LABELS WITH GOLDEN EFFECT/HUE

(71) Applicant: Illinois Tool Works Inc., Glenview, IL (US)

(72) Inventor: Huanyu Wei, Wilbraham, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/521,002

(22) Filed: Jul. 24, 2019

(65) Prior Publication Data

US 2020/0031161 A1 Jan. 30, 2020

Related U.S. Application Data

(60) Provisional application No. 62/711,154, filed on Jul. 27, 2018.

(51) Int. Cl.
| | |
|---|---|
| *B44C 1/17* | (2006.01) |
| *G09F 3/10* | (2006.01) |
| *B32B 7/12* | (2006.01) |
| *G09F 3/02* | (2006.01) |
| *D06Q 1/12* | (2006.01) |
| *D06P 5/24* | (2006.01) |
| *G09F 21/02* | (2006.01) |
| *G09F 3/04* | (2006.01) |

(52) U.S. Cl.
CPC .............. *B44C 1/1716* (2013.01); *B32B 7/12* (2013.01); *G09F 3/10* (2013.01); *B32B 2307/4026* (2013.01); *B32B 2519/00* (2013.01); *G09F 2003/0211* (2013.01); *G09F 2003/0282* (2013.01)

(58) Field of Classification Search
USPC .................................................. 156/230, 240
See application file for complete search history.

(56) References Cited

U.S. PATENT DOCUMENTS

| | | | |
|---|---|---|---|
| 5,919,834 A | 7/1999 | Downs et al. | |
| 7,910,203 B2 | 3/2011 | Colella et al. | |
| 9,266,372 B2 | 2/2016 | Colella et al. | |

(Continued)

FOREIGN PATENT DOCUMENTS

| | | |
|---|---|---|
| CN | 103319953 B | 9/2014 |
| CN | 204509841 U | 7/2015 |

(Continued)

OTHER PUBLICATIONS

International Search Report and Written Opinion issued by ISA/EPO in connection with PCT/US2019/043455 dated Nov. 4, 2019.

*Primary Examiner* — Sing P Chan
(74) *Attorney, Agent, or Firm* — Levenfeld Pearlstein, LLC

(57) ABSTRACT

A golden effect heat transfer label includes a carrier and a golden effect design layer on the carrier. The golden effect design layer is formulated from an ink having a golden effect pigment present in a concentration of about 5 percent to about 35 percent by weight of the ink. The golden effect heat transfer label is transferred from the carrier to a target object as a golden effect feature and the golden effect feature exhibits a robust golden effect on the target object. The golden effect feature exhibits no adhesion failure and no visual change after being subjected to standard testing. The golden effect heat transfer label can be transferred onto target objects including apparel items, plastics, metals and carbon fiber objects.

16 Claims, 1 Drawing Sheet

(56) References Cited

U.S. PATENT DOCUMENTS

| | | | |
|---|---|---|---|
| 9,266,373 | B2 | 2/2016 | Colella et al. |
| 9,349,305 | B2 | 5/2016 | Colella |
| 2014/0170395 | A1 | 6/2014 | Kasperchik et al. |

FOREIGN PATENT DOCUMENTS

| | | |
|---|---|---|
| EP | 1772215 A1 | 4/2007 |
| EP | 2924165 A1 | 9/2015 |
| JP | H11115391 A | 4/1999 |
| JP | 2012001581 A | 1/2012 |
| JP | 2012162682 A | 8/2012 |
| KR | 101774979 B1 | 9/2017 |

HEAT TRANSFER LABELS WITH GOLDEN EFFECT/HUE

CROSS-REFERENCE TO RELATED APPLICATION DATA

This application claims the benefit of and priority to Provisional U.S. Patent Application Ser. No. 62/711,154, filed Jul. 27, 2018, titled, "HEAT TRANSFER LABELS WITH GOLDEN EFFECT/HUE" the disclosure of which is incorporated therein in its entirety.

BACKGROUND

Heat transfer labels are well known and used in various industries. For example, heat transfer labels are used to transfer indicia onto fabrics for apparel, commercial products, including cosmetic containers, sports equipment and other substrates. Typically, heat transfer labels include thermoplastic layers capable of being adhered to the substrates upon application of heat and pressure.

Various types of heat transfer labels are known. Some labels are UV curing heat transfer labels and other are solvent-based or water-based thermoplastic ink systems. Examples of UV curing heat transfer labels are disclosed in Downs et al., U.S. Pat. No. 5,919,834, and Colella et al., U.S. Pat. No. 9,266,373, which documents are commonly assigned with the present application and are incorporated in their entirety by reference. Colella et al. discloses a textured heat transfer label.

Heat transfer labels with a matte or glossy golden effect or hue are also known. However, these labels suffer from a number of drawbacks. For example, known, golden effect or golden hue labels do not have a robust golden effect. In addition, there is poor resistance to dye migration. In order to prevent dye migration from underlying fabrics, dye blockers are typically needed.

In known labels, back up layers are needed as there is poor opacity of the labels. Fabrics with such labels also exhibit poor wash-fastness. That is, they commonly cannot withstand standard 60° C. wash tests and maintain the required color robustness. Moreover, such labels are solvent based and as such are not environmentally friendly.

Accordingly, there is a need for a label having a robust golden effect/hue. Desirably, the transfer from such a label maintains a robust golden effect/hue. More desirably still, such a label is highly resistant to dye migration and prevents or minimizes dye migration from underlying fabrics, without the use of dye blockers. Still more desirably, a transfer from such a label exhibits good wash-fastness, and can withstand standard 60° C. wash tests and maintain the required color robustness.

BRIEF SUMMARY

Various embodiments of a heat transfer label with a robust golden effect include a carrier and a golden effect design layer on the carrier. The golden effect design layer is formulated from an ink having a golden effect pigment present in a concentration of about 1 percent to about 50 percent, and preferably in a concentration of about 5 percent to about 35 percent, and preferably in a concentration of about 5 percent to about 15 percent by weight of the ink. The golden effect pigment can be present in a concentration of about 10 percent by weight of the ink. The golden effect heat transfer label is transferred from the carrier to an apparel item as a golden effect feature. The golden effect feature exhibits a robust golden effect on the apparel item. In embodiments, the ink is a water-based ink. In other embodiments, the ink is a solvent-based ink.

When applied to a fabric, the golden effect feature exhibits good dye migration resistance according to Nike standard colorfastness and dye migration for embellishment test and no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash, and exhibits no color transfer, no abrasion and no visual change after being subjected to an AATCC standard crock test, 10 crocks with an SDLATLAS CM-5 AATCC crockmeter and an TIC crockmeter using 2"×2" squares.

In embodiments, the golden effect feature has a matte finish. In embodiments, the golden effect feature has a glossy finish.

The label optionally includes an adhesive layer. In an embodiment, the adhesive layer is disposed on the golden effect design layer. The label optionally includes a lacquer layer disposed on the golden effect layer. In an embodiment an adhesive layer is disposed on the lacquer layer.

In embodiments, the golden effect design layer on the carrier is a first golden effect design layer, and the label further includes a second golden effect design layer disposed on the first golden effect design layer.

In aspects, a method of providing a durable, golden effect feature to a fabric target object, includes the steps of providing a golden effect heat transfer label having a carrier and a golden effect design layer on the carrier, which the golden effect design layer is formulated from an ink having a golden effect pigment in a concentration of about 1 percent to about 50 percent, and preferably in a concentration of about 5 percent to about 35 percent, and preferably in a concentration of about 5 percent to about 15 percent by weight of the ink. In some methods, the ink is a water-based ink and on other methods, the ink is a solvent-based ink.

The method further includes placing the golden effect heat transfer label onto the fabric target object with the golden effect design layer being closer to the target object than the carrier is closer to the fabric target object, applying heat and pressure to a back side of the carrier and separating the golden effect design layer from the carrier to define a golden effect feature and transferring and adhering the golden effect feature to the fabric target object.

When applied to a fabric, such a method produces a golden effect feature that exhibits good dye migration resistance according to Nike standard colorfastness and dye migration for embellishment test, and no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash, and exhibits no color transfer, no abrasion and no visual change after being subjected to an AATCC standard crock test, 10 crocks with an SDLATLAS CM-5 AATCC crockmeter and an TIC crockmeter using 2"×2" squares.

In another aspect, a method of providing a durable, golden effect feature to a plastic target object, includes providing a golden effect heat transfer label having a carrier and a golden effect design layer on the carrier, the golden effect design layer can be formulated from an ink having a golden effect pigment in a concentration of about 5 percent to about 35 percent by weight of the ink. The method further includes placing the golden effect heat transfer label onto the plastic target object with the golden effect design layer being closer to the target object than the carrier is closer to the plastic target object and applying heat and pressure to a back side of the carrier. Further still, the method includes separating the golden effect design layer from the carrier to define a golden effect feature and transferring and adhering the golden effect feature to the plastic target object. In such a method, the golden effect feature exhibits no tape adhesion failure and no noticeable visual change after being subjected to a standard cream resistance test and after being subjected to a fingernail scratch resistance test. The golden effect pigment can be present in a concentration of about 10 percent to about 15 percent by weight of the ink. The ink can be is a water-based ink.

In still another aspect, a method of providing a durable, golden effect feature to a metal or carbon fiber target object includes providing a golden effect heat transfer label having a carrier and a golden effect design layer on the carrier, the golden effect design layer can be formulated from an ink having a golden effect pigment in a concentration of about 5 percent to about 35 percent by weight of the ink. The method further includes placing the golden effect heat transfer label onto the metal or carbon fiber target object with the golden effect design layer being closer to the target object than the carrier is closer to the metal or carbon fiber target object and applying heat and pressure to a back side of the carrier.

Still further, the method includes separating the golden effect design layer from the carrier to define a golden effect feature and transferring and adhering the golden effect feature to the metal or carbon fiber target object. In such a method, the golden effect feature exhibits no tape adhesion failure and no noticeable visual change after being subjected to a standard scratch resistance test and a standard solvent resistance test.

The golden effect pigment can be present in a concentration of about 10 percent to about 15 percent by weight of the ink.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
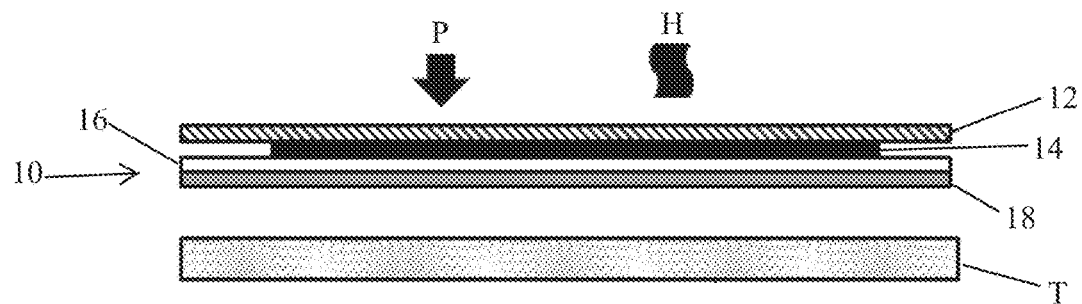
FIG. 1 is a schematic cross sectional view of an embodiment of a golden effect/hue heat transfer label according to an embodiment, the label shown prior to application to a target object.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated.

Various embodiments of a heat transfer label with a robust golden effect include a carrier and a golden effect design layer on the carrier. In an embodiment, the golden effect design layer is formulated from a water-based ink having a golden effect pigment present in a concentration of about 1 percent to about 50 percent, and preferably in a concentration of about 5 percent to about 35 percent, and preferably in a concentration of about 5 percent to about 15 percent by weight of the ink. The golden effect pigment can be present in a concentration of about 5 percent by weight of the ink. The golden effect heat transfer label is transferred from the carrier to an apparel item as a golden effect feature. The golden effect feature exhibits a robust golden effect on the apparel item. The ink can also be a solvent-based ink.

Referring now to the figures, FIG. 1 shows a schematic cross sectional view of an embodiment of a strong golden effect/hue (referred to herein as "golden effect") heat transfer label 10. Layer thicknesses are exaggerated for easy understanding and are not proportional in this embodiment and other embodiments shown in other figures in this disclosure.

Such a strong golden effect heat transfer label 10 provides a strong or robust effect in both matte and glossy labels. The label 10 exhibits good resistance to dye migration without dye blockers and good wash-fastness. It will be appreciated that wash-fastness refers to the ability to wash the target object T, such as an apparel item, and meet certain requirements, as discussed below.

Such a label 10 is also environmentally friendly, being a water-based label and copper-free. The label 10 exhibits good opacity, thus eliminating the need for back-up layers to "block" the underlying object color and can be used on objects including, for example, apparel items, cosmetic containers, sports equipment and automotive parts and components.

Figure 2:
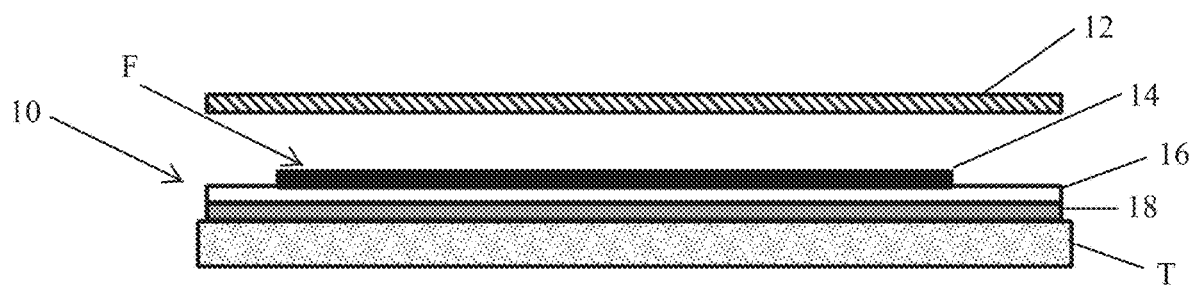
FIG. 2 is a schematic cross sectional view of the golden effect/hue heat transfer label of FIG. 1 applied to a target object.
Figure 3:
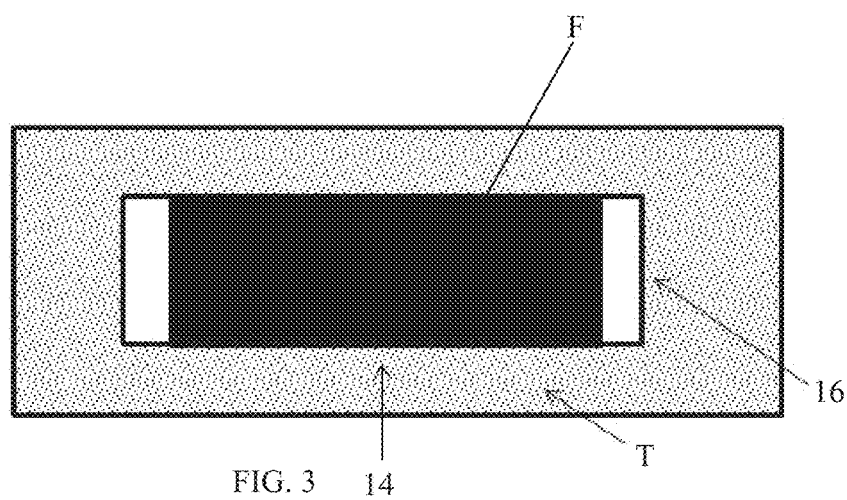
FIG. 3 is an overhead or plan view of an example of the golden effect/hue heat transfer label of FIGS. 1 and 2 applied to a target object.

The strong golden effect heat transfer label 10 generally includes a carrier 12, such as a carrier web, and a golden effect layer 14. The label can include and an optional clear or lacquer layer 16 and an optional adhesive layer 18. FIGS. 2 and 3 illustrated the label 10 as applied to a target object T in cross-sectional view (FIG. 2), and in plan or bird's eye view (FIG. 3).

The label 10 is configured such that the adhesive layer 18, if needed and the clear or lacquer layer 16, if needed, and the golden effect design layer 14 transfer and adhere to the target object T, upon application of heat H and pressure P on an outer surface of the carrier 12. When applied on the target object T, the strong golden effect design layer 14 provides a strong golden effect of the transferred design or features 20 on the target object T. It will be appreciated that although the golden effect layer 14, the clear or lacquer layer 16 if used, and the adhesive layer 18 if used are each illustrated as single layers, the golden effect layer 14 may comprise multiple inks and layers, and the clear or lacquer and the adhesive layers 16, 18 if used, each may comprise multiple layers.

It will also be appreciated that the golden effect layer 14 may be formulated to adhere directly to the target object T without an adhesive layer (thus the adhesive layer is optional) and the golden effect layer 14 may not require a clear or lacquer layer between it and an adhesive layer, again, if needed.

In embodiments, the golden effect design layer 14 is printed onto the carrier 12, and can include a pattern. As an example, a logo can be printed in or as a design that is applied to an area on the carrier 12. For example, the golden effect design layer 14 can be a logo for which certain design aesthetics are desired.

The carrier 12 can be formed from a wide variety of materials as will be recognized by those skilled in the art. In one embodiment, the carrier is formed as a web from a 92 gauge (92 ga) clear, untreated packaging grade polyester film. As will be readily appreciated, one benefit of using a clear material for carrier is that, if desired, one can inspect the quality of the golden effect design layer 14 of the label 10 by looking at the layers through the carrier 12. Other suitable materials include polyethylene phthalate (PET) and polypropylene (PP).

The material for the carrier layer 12 is selected such that surface energy of the carrier is sufficiently high for printing the golden effect design layer 14, but allows the golden effect design layer 14 to be transferred to the target object T upon application of heat and pressure.

The adhesive layer 18, if used, is applied over the golden effect design layer 14 or the lacquer layer 16, if used. The adhesive layer 18 may be formed from a thermoplastic composition that melts or softens upon application of heat and pressure, and adheres to the target object T to attach the golden effect label feature F to the target object T. For example, suitable thermoplastic compositions may be formulated with thermoplastic resins and hotmelt powders. Suitable hotmelt powder resins include, but are not limited to, thermoplastic polyurethanes, copolyesters, and copolyamides. In such a thermoplastic composition, the hotmelt powder may be dispersed in thermoplastic resin binder and may have a particle size distribution suitable for the screen mesh being used for printing.

In embodiments, a golden effect design layer 14 is prepared as a water-based ink formulation including the following components:

TABLE 1

| Component | % by weight of the ink |
|---|---|
| CM4481 Versa T Clear | 79 |
| Zenexo Golden Shine 21YY | 10 |
| Surfynol PSA336 | 2 |
| Water | 9 |
| Total | 100.00 |

In an embodiment, a golden effect design layer 14 ink was formulated according to TABLE 1, by adding 40 g of a pigment, Zenexo Golden Shine 21YY, commercially available from SCHLENK AG, into a water based composition of 316 g of CM4481 Versa T Clear, commercially available from ITW Graphics, 8 g of Surfynol PSA336, commercially available from Evonik Industries AG, and 36 g of water while mixing.

The above golden effect design layer 14 ink with 1.7% of IFSCT, which is an aziridine crosslinker, commercially available from ITW Graphics is printed on a carrier web 12 of PET film SLV as first a golden effect design layer 14. The same ink was printed on the first golden effect design layer 14 as second golden effect design layer 14. A water based adhesive 18, CM4546, commercially available from ITW Graphics, which is a water based polyurethane adhesive, was printed on top of the golden effect design layers 14 to make a heat transfer label 10 with a matte golden effect.

The heat transfer label 10 with the matte golden effect was transferred to a fabric T by an INVISTA® flat stamper at conditions of 288° F., 60 psi pressure and 18 sec dwelling time. The fabric T with a heat transferred golden label (the feature F) was subject to a Nike standard embellishment durability wash tests, Accelerated Wash, 5 washes at 60° C. and Innovation Standard Wash, 15 washes at 60° C., with a Miele PW6065 washing machine and tumbled dry after each wash with an automatic dryer, and successfully passed the tests. No adhesion failure, no color change, no stain, and no visual change were observed with the golden effect feature F.

The fabric T with a matte golden effect feature F was also subject to an AATCC standard crock test, 10 crocks with a SDLATLAS CM-5 AATCC crockmeter and TIC crockmeter 2"×2" squares, and passed the test. No color transfer, abrasion or visual changes were observed, and successfully passed the test. No abrasion and no visual change were observed.

An FC Barcelona sports club shirt (jersey) with blue and red stripes had a matte golden effect feature F transferred thereto from a label 10 and was subject to a standard dye migration test. The samples were placed under a white fabric and sandwiched between two plexiglass plates in an AATCC standard perspiration tester under 8.15 pounds weight, and aged at 70° C. for 48 hours in an oven, according to Nike standard colorfastness and dye migration for embellishment test method.

The fabric with the golden effect feature F successfully passed the test with a grey scale of 4.5 (4.0 and above is passing). No dye/color was observed to pass onto the label 10 surface (on to the feature F) and the white fabric on top of the samples. Prior known heat transfer labels for apparel require dye blocker inks to be printed between backup ink layers and adhesive layers to provide resistance to dye migration from the fabric, especially polyester fabrics. In the FC Barcelona sports club shirt fabric noted above, the matte golden design feature F exhibited good resistance to dye migration without the need for dye blocker layers.

In another embodiment, a glossy golden effect heat transfer label 10 was made from a golden effect design color ink that was formulated according to TABLE 1, by adding 40 g of a pigment, Zenexo Golden Shine 21YY, commercially available from SCHLENK AG, into a water based composition of 316 g of CM4481 Versa T Clear, commercially available from ITW Graphics, 8 g of Surfynol PSA336, commercially available from Evonik Industries AG, and 36 g of water while mixing.

The golden effect design color ink with 1.7% of IFSCT, which is an aziridine crosslinker, commercially available from ITW Graphics, was printed on a carrier web 12 of PET film FX 4 mil as a first golden color design layer 14. The same ink was printed on the first golden color design layer 14 as second golden color design layer 14. A water based clear lacquer 16, CM4481, commercially available from ITW Graphics, with 1.7% of IFSCT, which is an aziridine crosslinker, commercially available from ITW Graphics, was printed on top of the design golden design layers 14.

A water based adhesive 18, CM4546, commercially available from ITW Graphics, which is a water based polyurethane adhesive, was printed on top of the golden effect layers 14 to make a heat transfer label 10 with a glossy golden effect. The heat transfer label 10 with the glossy golden effect was transferred to a fabric T by an INVISTA® flat stamper at conditions of 288° F., 60 psi pressure and 18 sec dwelling time. The fabric with the heat transferred glossy golden feature F was subject to the Nike standard embellishment durability wash tests, Accelerated Wash, 5 washes at 60° C. and Innovation Standard Wash, 15 washes at 60° C., with a Miele PW6065 washing machine and tumbled dry after each wash with an automatic dryer, and successfully passed the tests. No adhesion failure, no color change, no stain, and no visual change were observed with the glossy golden feature.

The fabric T with a heat transferred glossy golden effect feature F was also subject to an AATCC standard crock test, 10 crocks with a SDLATLAS CM-5 AATCC crockmeter and TIC crockmeter 2"×2" squares, and passed the test. No color transfer, abrasion or visual changes were observed.

An FC Barcelona sports club shirt (jersey) T with blue and red stripes had a glossy golden feature F transferred from a glossy golden effect heat transfer label 10 transferred thereto and was subject to a standard dye migration test. The samples were placed under a white fabric and sandwiched between two plexiglass plates in an AATCC standard perspiration tester under 8.15 pounds weight, and aged at 70° C. for 48 hours in an oven, according to Nike standard colorfastness and dye migration for embellishment test method.

The fabric with the glossy golden feature F successfully passed the test with a grey scale of 4.5 (4.0 and above is passing). No dye/color was observed to pass on the label surface (onto the feature F) and the white fabric on top of the sample. Prior known heat transfer labels for apparel require dye blocker inks to be printed between backup ink layers and adhesive layers, to provide resistance to dye migration from the fabric, especially polyester fabrics. In the FC Barcelona sports club short fabric noted above, the glossy golden color design layers exhibited good resistance to dye migration without the need for dye blocker layers. It will be appreciated that solvent-based inks may also be formulated for use with apparel.

In embodiments, a golden effect design layer 14 is prepared as a solvent based ink formulation including the following components:

TABLE 2

| Component | % by weight of the ink |
|---|---|
| OV427 clear (resin solution) | 85.24 |
| Zenexo Golden Shine 21YY | 12.00 |
| Dinch | 1.46 |
| Foamex N | 0.30 |
| Disparlon A670-20M | 1.00 |
| Total | 100.00 |

In this formulation, the pigment is present in a concentration of about 12 percent by weight of the design color ink. It has been observed that such a formulation is suitable for, for example, packaging label for use with plastic jars and tubes, such as plastic cosmetic jars and tubes, and for use with plastic personal care items, such as tooth brushes, razor handles and the like.

The golden effect design layer ink was printed onto a carrier web PET film AB1354 (supplied by ITW Foils of Newburyport, Mass.), as the golden effect design layer to make a heat transfer label with golden effect. The golden effect heat transfer feature was transferred to a PETG cosmetic jar (PET with the addition of glycol, available from CPP Global of Asheboro, N.C.) or a post-consumer recyclable (PCR) cosmetic jar by using a roller transfer machine available from United Silicone Inc. The PETG or PCR cosmetic jar with the heat transferred golden effect label was subject to a cream resistance test. A standard brand named skin cream was applied onto the label, and was kept in an oven at 50° C. for 48 hours. The heat transferred golden effect feature on the cosmetic jar passed the test with no noticeable visual change being observed. The PETG or PCR cosmetic jar with the heat transferred golden effect feature was also subject to tape adhesion and fingernail scratch resistance testing, and passed these tests with no noticeable difference and defects in the transferred feature following the tests.

Another example of an ink formulation for hard surface applications to, for example, sports equipment such as a golf club shaft, includes the following components:

TABLE 3

| Component | % by weight of the ink |
|---|---|
| OV183 clear (resin solution) | 76.70 |
| Zenexo Golden Shine 21YY | 15.00 |
| Dinch | 2.00 |
| Butyl Lactate | 5.00 |
| Disparlon A670-20M | 1.00 |
| Foamex N | 0.30 |
| Total | 100.00 |

In this formulation, the pigment is present in a concentration of about 15% by weight of the ink formulation. It has been observed that such a formulation is suitable, for example, for heat transfer labels for use with sport equipment, such as painted carbon fiber or steel golf club shafts, arrow shafts and the like.

The above noted formulation was printed onto a carrier web PET film 803 (supplied by Loparex), as the golden effect design layer, backed with an OV345 adhesive (supplied by ITW Graphics) to make a heat transfer label with golden effect feature. The golden effect heat transfer feature was transferred to a painted carbon fiber golf club shaft and to a steel golf club shaft by using a roller transfer machine available from ITW United Silicone. The golf club shaft was then clear coated with an automotive grade clear coat. The golf club shafts passed standard tape adhesion testing, scratch resistance testing and solvent resistance testing with no noticeable visual change being observed in the golden effect features.

It is to be understood that the particular compositions of the carrier 12, the lacquer 16 if used, the golden effect design layer 14, and adhesive layer 18 if used, may vary from the specific compositions disclosed herein depending upon the composition of the target object T to which the label 10 (feature F) is to be applied and the desired glossy or matte finish.

It will also be appreciated that for the sake of simplicity of description, a single golden effect design layer 14 is disclosed, but that multiple layers 14 of the golden effect ink can be used to achieve a wide variety of desired visually appealing effects, all of which are within the scope and spirit of the present disclosure.

The words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents and published application referred to in this disclosure are incorporated herein in their entirely whether or not expressly done so herein.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A golden effect heat transfer label, comprising:
a carrier;
a golden effect design layer on the carrier, the golden effect design layer formulated from an ink having a golden effect pigment present in a concentration of about 5 percent to about 35 percent by weight of the ink;
a lacquer layer disposed on the golden effect layer; and
an adhesive layer disposed on the lacquer layer,
wherein the golden effect heat transfer label is transferred from the carrier to an apparel item as a golden effect feature, and wherein the golden effect feature exhibits a robust golden effect on the apparel item,
wherein the golden effect feature exhibits good dye migration resistance when subjected to a Nike standard colorfastness and dye migration for embellishment test, and no adhesion failure, no color change, no stain and no visual change after being subjected to a Nike standard embellishment durability wash test of an accelerated wash, 5 times at a temperature of 60° C. and an innovation standard wash, 15 times at a temperature of 60° C., and being tumbled dry after each wash, and
wherein the golden effect feature exhibits no color transfer, no abrasion and no visual change after being subjected to an AATCC standard crock test, 10 crocks with an SDLATLAS CM-5 AATCC crockmeter and an TIC crockmeter using 2"×2" squares.

2. The golden effect heat transfer label of claim 1, wherein the golden effect pigment is present in a concentration of about 5 percent to about 15 percent by weight of the ink.

3. The golden effect heat transfer label of claim 1, wherein the ink is a water-based ink.

4. The golden effect heat transfer label of claim 1, wherein the golden effect feature has a matte finish.

5. The golden effect heat transfer label of claim 1, wherein the golden effect feature has a glossy finish.

6. The golden effect heat transfer label of claim 1, wherein the golden effect design layer on the carrier is a first golden effect design layer, and including a second golden effect design layer disposed on the first golden effect design layer.

7. The golden effect heat transfer label of claim 1, wherein the golden effect pigment is present in a concentration of about 10 percent by weight of the ink.

8. A method of providing a durable, golden effect feature to a fabric target object, comprising the steps of:
providing a golden effect heat transfer label, the golden effect heat transfer label having a carrier and a golden effect design layer on the carrier, a lacquer layer disposed on the golden effect layer, an adhesive layer disposed on the lacquer layer, the golden effect design layer formulated from an ink having a golden effect pigment in a concentration of about 5 percent to about 35 percent by weight of the ink;
placing the golden effect heat transfer label onto the fabric target object with the golden effect design layer being closer to the target object than the carrier is closer to the fabric target object;
applying heat and pressure to a back side of the carrier; and
separating the golden effect design layer from the carrier to define a golden effect feature and transferring and adhering the golden effect feature to the fabric target object,
wherein the golden effect feature exhibits no adhesion failure, no color change, no stain, and no visual change after being subjected to a Nike standard embellishment durability wash tests of an accelerated wash, 5 times at a temperature of 60° C. and an innovation standard wash, 15 times at a temperature of 60° C., and being tumbled dry after each wash, and
wherein the golden effect feature exhibits no color transfer, no abrasion and no visual change after being subjected to an AATCC standard crock test, 10 crocks with an SDLATLAS CM-5 AATCC crockmeter and an TIC crockmeter using 2"×2" squares.

9. The method of claim 8, wherein the golden effect pigment is present in a concentration of about 10 percent to about 15 percent by weight of the ink.

10. The method of claim 8, wherein, wherein the ink is a water-based ink.

11. The method of claim 8, wherein the ink is a solvent-based ink.

12. A method of providing a durable, golden effect feature to a plastic target object, comprising the steps of:
providing a golden effect heat transfer label, the golden effect heat transfer label having a carrier and a golden effect design layer on the carrier, a lacquer layer disposed on the golden effect layer, and an adhesive layer disposed on the lacquer layer, the golden effect design layer formulated from an ink having a golden effect pigment in a concentration of about 5 percent to about 35 percent by weight of the ink;
placing the golden effect heat transfer label onto the plastic target object with the golden effect design layer being closer to the target object than the carrier is closer to the plastic target object;
applying heat and pressure to a back side of the carrier; and
separating the golden effect design layer from the carrier to define a golden effect feature and transferring and adhering the golden effect feature to the plastic target object,
wherein the golden effect feature exhibits no tape adhesion failure and no noticeable visual change after being subjected to a standard cream resistance test and after being subjected to a fingernail scratch resistance test.

13. The method of claim 12, wherein the golden effect pigment is present in a concentration of about 10 percent to about 15 percent by weight of the ink.

14. The method of claim 12, wherein the ink is a water-based ink.

15. A method of providing a durable, golden effect feature to a metal or carbon fiber target object, comprising the steps of:
providing a golden effect heat transfer label, the golden effect heat transfer label having a carrier and a golden effect design layer on the carrier, a lacquer layer disposed on the golden effect layer, and an adhesive layer disposed on the lacquer layer, the golden effect design layer formulated from an ink having a golden effect pigment in a concentration of about 5 percent to about 35 percent by weight of the ink;
placing the golden effect heat transfer label onto the metal or carbon fiber target object with the golden effect design layer being closer to the target object than the carrier is closer to the metal or carbon fiber target object;

applying heat and pressure to a back side of the carrier; and separating the golden effect design layer from the carrier to define a golden effect feature and transferring and adhering the golden effect feature to the metal or carbon fiber target object, wherein the golden effect feature exhibits no tape adhesion failure and no noticeable visual change after being subjected to a standard scratch resistance test and a standard solvent resistance test.

16. The method of claim 15, wherein the golden effect pigment is present in a concentration of about 10 percent to about 15 percent by weight of the ink.

* * * * *